(No Model.)
S. J. MOORE.
TIRE HEATER.
No. 342,219. Patented May 18, 1886.
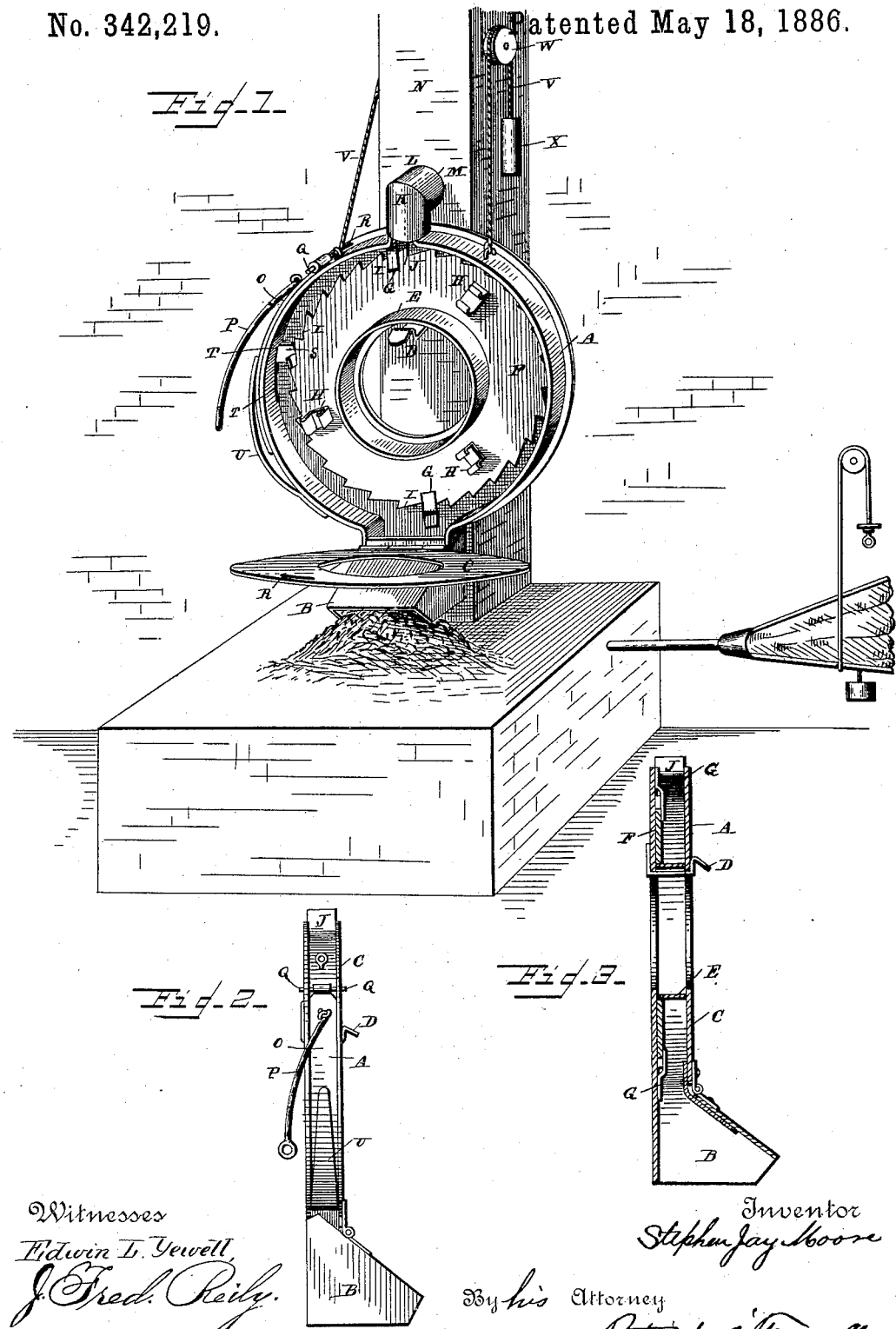
Witnesses
Edwin L. Yewell
J. Fred. Reily
Inventor
Stephen Jay Moore
By his Attorney
Patrick O'Farrell
N. PETERS, Photo-Lithographer, Washington, D. C.

UNITED STATES PATENT OFFICE.

STEPHEN JAY MOORE, OF WALKER, MISSOURI, ASSIGNOR OF ONE-HALF TO JOHN CHARLES LIGHT, OF SAME PLACE.

TIRE-HEATER.

SPECIFICATION forming part of Letters Patent No. 342,219, dated May 18, 1886.

Application filed April 1, 1886. Serial No. 197,425. (No model.)

*To all whom it may concern:*

Be it known that I, STEPHEN JAY MOORE, a citizen of the United States, residing at Walker, in the county of Vernon and State of Missouri, have invented certain new and useful Improvements in a Tire-Heater; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists in the improved construction and arrangement of parts of a tire-heater in which the circular frame supporting the tire may be rotated as desired, so as to subject all parts of the tire to the point where the greatest heat enters the casing in which the tire is supported, as will be hereinafter fully described, and pointed out in the claims.

Referring to the annexed drawings, Figure 1 is a perspective view of my improved tire-heater in its operative position, the outer door of the casing being shown partially open. Fig. 2 is a side elevation with the door closed, and Fig. 3 is a vertical sectional view taken on the plane indicated by line $x\,x$, Fig. 1 of the drawings.

The same letters of reference indicate corresponding parts in all the figures.

Referring to the several parts by letter, A represents the circular body portion of the casing of my improved tire-heater, the said casing being extended at the point which I will call the "lower" end of the casing to form the flaring inlet B, which serves to conduct all of the body of heat from the forge into the casing when the heater is lowered into its operative position, as shown in Fig. 1 of the drawings. The outer side of this casing is closed by the hinged door C, which is held in its closed position by the spring-catch D, although it is obvious that any other suitable catch or lock may be employed for this purpose.

The casing A is formed with the central circular flange, E, around which travels the skeleton wheel or circular frame F, which supports the tire in position to be heated, the said circular frame being prevented from slipping on the supporting-flange E by the guides G. The outer side of the circular frame is provided with the brackets H, in which the tire is supported, while the outer periphery of the said frame is formed with the circular series of inclined teeth I. The upper end of the casing is formed with the outlet-flue J, on which is mounted by a common elbow, K, a short pipe, L, which when the casing is lowered into its operative position is turned in into a suitable opening, M, made in the side of the flue of the forge, by which arrangement the heat passsing through the casing is conveyed into the flue N. To the left side of the casing slides on its outer circular flange the curved metal strip O, which is provided with the operating-handle P, and is formed at its upper end with the guide-lugs Q, projecting to each side and sliding in the segmental guide-slots R in the casing. The metal strip is provided centrally with the inwardly-projecting arm, S, which works through a slot, T, in the outer flange of the casing and engages with the inclined teeth of the circular frame F, passing over the inclined sides of said teeth when the metal strip O is raised by its operating-handle, but engaging with the straight sides of the teeth when the said strip is drawn down, as will be readily understood. A flat spring, U, is secured at one end to the side of the casing and bears with its free end against the lower portion of the metal strip O, thereby automatically holding the arm S to its work.

The casing is preferably supported against the breast or outer side of the flue by means of chains or ropes, V, passing over pulleys W in the roof of the smithy, and having suitable weights, X, on their free ends, which serve to counterbalance the weight of the casing and tire, and permit of the same being readily raised and lowered.

When not in use, the casing may be drawn up out of the way, but when a tire is to be expanded it is drawn down into the position shown in Fig. 1 of the drawings, when the flaring inlet B and the back of the lower portion of the casing will cut off the draft except through the casing, and cause all the heat from the forge to pass directly through the casing and out at its top through the elbow K and short pipe L into the flue N, the short pipe L having been swung around and fitted into the opening M leading into the flue.

The tire to be expanded is placed in the casing by opening the door C and placing the same in the brackets H of the circular frame F, when the door is again closed. In order to prevent the tire becoming overheated at any one point, the circular frame which supports it may be rotated by pushing up the handle P of the metal strip O and then drawing down upon the same, when the arm S of the said strip will engage with the teeth of the circular frame and rotate it on each downward motion of the said strip, and it will be seen that the frame may be thus rotated to any desired extent.

Other work may be carried on at the forge at the same time that the tire is being heated; and if it is not convenient to attach the casing to the forge it can be used on a separate small brick furnace in any part of the shop, or, if desired, it may be used out of doors.

From the foregoing description, taken in connection with the accompanying drawings, the construction and operation of my improved tire-heater will be readily understood.

By the use of my device more uniform heat and a more convenient method is obtained with the expenditure of a great deal less fuel, as it obviates the necessity of preparing a considerable amount of wood necessary to heat a tire by the old method, and the danger of accidentally setting fire to the shop is also greatly lessened.

Having thus described my invention, what I claim and desire to secure by Letters Patent of the United States, is—

1. The combination of the casing having the flaring inlet, the central circular flange, the hinged door, and the top outlet-opening, the circular frame having the brackets secured upon its side and formed with the circular series of inclined teeth, and the curved spring-actuated strip having the operating-handle and the inwardly-projecting arm, arranged to operate in the manner and for the purpose shown and set forth.

2. The combination of the casing having the flaring inlet, the central circular flange, the hinged door, the top outlet-opening, and the short pipe connected by the elbow to the said opening and adapted to lead into the forge-flue through a suitable opening in the side thereof, the circular frame having the brackets secured upon its side and formed with the circular series of inclined teeth, and the curved spring-actuated strip having the operating-handle and the inwardly-projecting arm, arranged to operate in the manner and for the purpose shown and specified.

3. The combination of the casing supported and balanced by the weighted chains passing over the pulleys and having the flaring inlet, the central circular flange, the hinged door, and the top outlet-opening, the circular frame having the brackets secured upon its side and formed with the circular series of inclined teeth, and the curved spring-actuated strip formed at its upper end with the transverse guide-lugs, and having the operating-handle and the inwardly-projecting arm, arranged to operate in the manner and for the purpose shown and described.

In testimony whereof I affix my signature in presence of two witnesses.

STEPHEN JAY MOORE.

Witnesses:
C. L. FULKERSON,
GEORGE G. WYSS.